United States Patent [19]
Etievant

[11] Patent Number: 5,060,232
[45] Date of Patent: Oct. 22, 1991

[54] FREE ELECTRON LASER

[75] Inventor: Claude Etievant, Versailles, France

[73] Assignee: Commissariat A L'energie Atomique, Paris, France

[21] Appl. No.: 570,325

[22] Filed: Aug. 21, 1990

[30] Foreign Application Priority Data

Aug. 24, 1989 [FR] France ............... 89 11214

[51] Int. Cl.$^5$ ............................................. H01S 3/00
[52] U.S. Cl. ......................................... 372/2; 372/69
[58] Field of Search ...................................... 372/2, 69

[56] References Cited

U.S. PATENT DOCUMENTS 4,491,948  1/1985  Deacon et al. ................... 372/2
4,740,973  4/1988  Madey et al. .................... 372/2

OTHER PUBLICATIONS

N.T.I.S. Tech Notes, Nov. 1986, p. 1265.
Article by R. Collela et al., Optics Communication, vol. 50, No. 1, May 1984, pp. 41-44.
Article by A. Prakash et al., IEEE Transactions on Nuclear Science, vol. NS-32, No. 5, part 2, Oct. 1985, pp. 3265-3267.
Article by C. W. Roberson et al., IEEE Transactions on Nuclear Science, vol. NS-30, No. 4, part 2, Aug. 1983, pp. 3162-3164.
Article by A. Mondelli et al., IEEE Transactions on Nuclear Science, vol, BS-30, No. 4, part 2, Aug. 1983, pp. 3212-3214.

Primary Examiner—Léon Scott, Jr.
Attorney, Agent, or Firm—Pearne, Gordon, McCoy & Granger

[57] ABSTRACT

Free electron laser.
This laser includes a source (2) of electrons, means (4) for accelerating the electrons which supply a beam of electrons, a ring (6) for storing this beam and comprising at least one rectilinear section, magnetic means (22) provided to create a closed magnetic configuration having one first component mainly directed parallel to the circulating beam of electrons and which enables this beam to be contained, and one second component suitable for compensating the drift of the electrons transversally to the axis of the beam of electrons, and at least one magnetic wiggler (10) placed at the level of the rectilinear section and which is traversed by the beam of electrons. Application for fusion controlled by magnetic containment.

10 Claims, 5 Drawing Sheets

FREE ELECTRON LASER

FIELD OF THE INVENTION

The present invention concerns a free electron laser adapted to the transmission of a high power electromagnetic radiation for dwarf waves and far-infrared applications.

BACKGROUND OF THE INVENTION

As regards the remainder of this text, the word "laser" is taken both as an amplifier and an oscillator.

The invention can be used in telecommunications applications and in fusion applications controlled by means of magnetic containment.

Research relating to the physics of Tokamaks is particularly concerned with the following:

diagnostic methods (see document (1) which, like the other documents subsequently referred to, is mentioned at the end of this description immediately preceding the claims), current generating methods (see documents (2) and (3)), heating methods (see documents (4) and (5)), methods which require millimetric sources with power exceeding 1 MW in an almost continuous state.

The electromagnetic radiation sources able to be considered for such applications are mainly gyrotrons and free electron lasers, the latter being particularly known by virtue of the document (6) to be referred to subsequently.

Free electron lasers posses various advantages with respect to gyrotrons and especially frequency tunability and the possibility of covering the field of dwarf and sub-dwarf waves, far-infrared, etc., without requiring any major design modification.

A number of experiments have already been conducted on free electron lasers, one of which is mentioned in document (7). The present invention concerns a free electron laser able to emit a high-power electromagnetic radiation in the form of pulses with a much longer duration, for example an electromagnetic radiation with a power of greater than 1 MW within the spectral range extending from 150 GHz to about 300 GHz in the form of repetitive pulses in a continuous state and lasting more than one millisecond.

SUMMARY OF THE INVENTION

To this effect, the present invention uses a beam of electrons accelerated and stored in a storage ring in which an axial magnetic field is created mainly directed parallel to the beam of electrons.

More specifically, the object of the present invention is to provide a free electron laser, wherein it includes:

a source of electrons, acceleration means adapted to accelerate the electrons derived from the source and which supply a beam of electrons, a ring for storing this beam of electrons and comprising at least one rectilinear section, magnetic means provided to create a closed magnetic configuration and having one first component with a magnetic field and which is mainly directed parallel to the circulating beam of electrons and which enables this beam to be contained, and a second magnetic field component adapted to compensate the drift of the electrons transversally to the axis of the beam of electrons, and at least one magnetic wiggler provided with the storage ring and which is placed at the level of said rectilinear section and which is traversed by the beam of electrons circulating in the ring.

The structure of the free electron laser of the present invention advantageously lends itself to the production of high-powered long lasting electromagnetic pulses in dwarf wave and far-infrared applications, the recirculation of the beam of electrons resulting in a favorable energy balance, the conversion efficiency of the laser (ratio of the electromagnetic power produced to the power required for functioning of the laser) being considerable.

In the present invention, an axial magnetic field is used which recloses onto itself according to a ring configuration. A racecourse or hippodrome configuration is advantageous as regards the present invention in that it comprises two rectilinear sections with a magnetic wiggler able to be placed at one of these sections, but generally speaking, any closed ring configuration having at least one rectilinear section where a magnetic wiggler is able to be placed can be used in the present invention.

By way of example, in order to produce a high-powered electromagnetic radiation in the form of long duration pulses, it is possible, during the laser transmission time, to keep the intensity I of the beam of electrons at a value of about from 100 to 500 A, the energy E of the electrons at a value of approximately between 400 and 1000 keV, and the axial magnetic field $B_z$ at a value of about 1T.

In order to do this, the production of the beam of electrons and production of the axial magnetic field both play a significant role.

In the present invention, it can be seen that operation takes place in a ring beam state and effected in a magnetic axial field configuration closed onto itself, which allows for recirculation of the beam of electrons. Such a magnetic configuration is already known, but in this instance for a completely other use, namely the containment of a hot plasma for controlled thermonuclear fusion.

In this respect, the present invention states that it is possible to use a magnetic configuration whose second component is a poloidal component giving the magnetic field lines a rotational transformation allowing for compensation of the drift of the electrons transversally to the axis of the beam of electrons.

A Stellarator or Torsatron type magnetic configuration is used, for example. Precisions shall subsequently be given concerning these two configurations which are properly adapted to the storage of an intense beam of electrons.

It is also possible to use a Tokamak type configuration.

Returning to the problem of producing the beam of electrons and to the values given earlier by way of example, it shall be observed that the recirculation of the beam of electrons is significant from the energy point of view. In fact, if the electrons are contained in the storage ring for N rotations, it merely suffices that the electronic current to be injected to form the beam of electrons (with intensity I) has an intensity equal to I/N and that a power P/N is consumed in order to form this beam of electrons, P being equal to I.V with V roughly being between 400 and 1000 kV.

If the containment of the beam of electrons in the magnetic configuration is of suitable quality and if N is extremely large, the power to be supplied to accelerate the beam remains within acceptable limits.

For example, by using a storage ring whose perimeter is about 3 meters, containment times of about 10 microseconds or more make it possible to obtain a number of rotations N equal at least to 1000 and, because of this, makes it possible to restore the power needed to be consumed so as to form the beam of electrons within acceptable limits.

As regards the axial magnetic field, the latter plays two main roles in the present invention.

Firstly, it ensures guiding of the beam of electrons and prevents this beam from becoming dispersed under the effect of transversal forces due to the volume charge.

Secondly, this axial magnetic field enables the beam of electrons to resonate with the magnetic wiggler. This occurs when, via the Doppler effect, the speed of the electrons introduces a frequency shift making the electrons at their own cyclotronic frequency aware of the interference due to the magnetic wiggler.

The production of the axial magnetic field naturally requires electric energy consumption in windings intended to create this field and situated outside the storage ring (made of a non-magnetic material).

For a storage ring whose perimeter is about 3 meters, it is estimated that an electric power of about 400 kW enables an axial field of about 1T to be obtained.

Although considerable, such a power remains small compared with a power of more than 1 MW for the electromagnetic radiation transmitted by the laser of the invention and compared also with a power of more than 40 MW for the transported beam of electrons.

It can be seen that it is advantageous to have the beam of electrons circulate a large number of times by virtue of the containment magnetic field.

By defining the overall efficiency n of the laser by means of the following formula:

$$n_g = P_e/(P_e + (P_f/N) + P_b)$$

a formula in which $P_e$, $P_f$ and $P_b$ respectively represent the power of the electromagnetic radiation transmitted by the laser, the power transported by the beam of electrons and the electric power consumed in the external windings, it is possible to obtain an overall efficiency of more than 0.5.

According to one preferred embodiment of the laser of the invention, the source of electrons is placed inside the storage ring and includes means for transmitting the electrons and sending these onto the magnetic axis of the magnetic configuration, a magnetic axis along which they are then accelerated.

Preferably, the acceleration means of the electrons include suitable means for generating and temporarily varying a magnetic flux in a flat surface delimited by the storage ring, the magnetic flux variation in the storage ring inducing a longitudinal electric field.

The acceleration means of the electrons may then include, for example, a transformer comprising:

a magnetic circuit traversing the flat surface delimited by the storage ring, and a primary circuit controlled in such a way as to obtain said magnetic flux variation, the beam of electrons circulating inside the storage ring forming a secondary circuit for the transformer.

In fact, it is much simpler to form and accelerate the beam of electrons in the storage ring than by forming and accelerating this beam of electrons outside the storage ring so as to then inject it into the used magnetic configuration.

According to one particular embodiment of the laser of the invention, the path followed by the beam of electrons comprises a plurality of rectilinear sections, the laser includes a plurality of magnetic wigglers respectively placed at the level of the rectilinear sections and successively traversed by the beam of electrons and the laser further includes, between each magnetic wiggler and the immediately next magnetic wiggler, light reflection means so that the light (or electromagnetic radiation) generated in each wiggler is reflected towards the next wiggler.

In this case, the magnetic wigglers may be distributed along the storage ring so that the path of the light generated in the laser has the shape of a polygon.

Such a structure is well adapted to the embodiment of a free electrons laser provided with a Stellarator type magnetic configuration and functions as an oscillator.

BRIEF DESCRIPTION OF THE DRAWINGS

The present invention shall be more readily understood from a reading of the following description of embodiment examples, given purely by way of illustration and being in no way restrictive, with reference to the accompanying drawings in which.

DETAILED DESCRIPTION OF THE PREFERRED EMBODIMENTS

Figure 1:
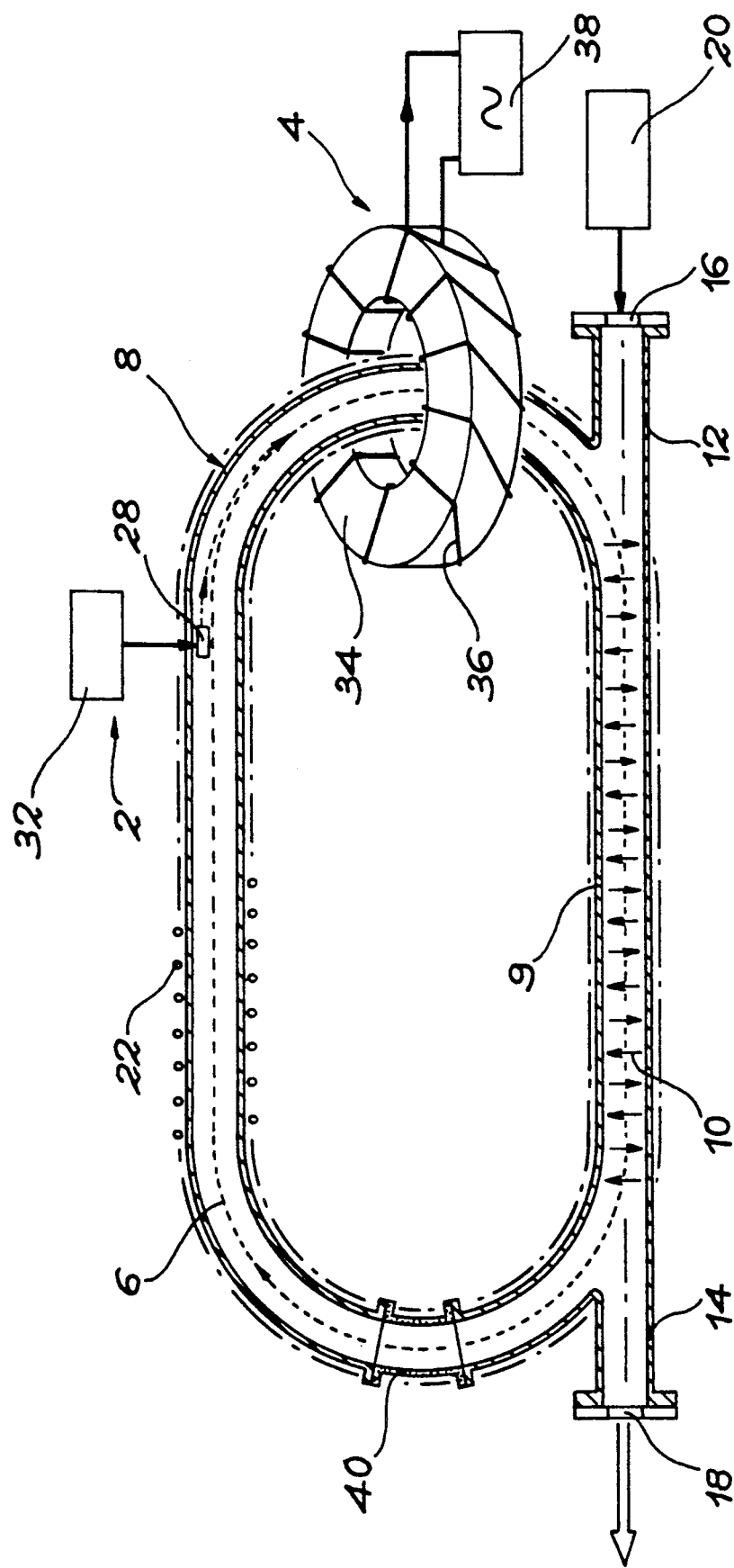
FIG. 1 is a diagrammatic view of a free electron laser conforming to the invention and functioning as an amplifier, FIGS. 2A and 2B diagrammatically illustrate spire windings respectively leading to a Stellarator type magnetic configuration and a Torsatron type magnetic configuration, both these configurations able to be used in the laser of FIG. 1, FIG. 3 diagrammatically illustrates the rotational transformation characteristic feature possessed by these magnetic configurations, FIG. 4 diagrammatically illustrates a source of electrons able to be used in the laser of FIG. 1.

FIG. 1 diagrammatically represents a free electron laser conforming to the invention and functioning as the amplifier of an electromagnetic radiation. This laser includes a source of electrons 2, acceleration means 4 provided to accelerate the electrons derived from the source 2 and which supply a beam of relativist electrons 6 and a ring 8 for storing the beam of electrons.

This storage ring has the shape of a race course and thus comprises two rectilinear sections opposite each other. One 9 of these rectilinear sections is provided with a magnetic wiggler 10. On both sides of this magnetic wiggler 10, the storage ring 8 comprises elongations extending along the axis of the rectilinear section 9. These elongations are closed by flanges provided with windows 16 and 18.

A source 20 of the electromagnetic radiation desired to be amplified is placed opposite one of the windows, namely the window 16 in the example represented, so as to send this radiation in the wiggler 10 in the direction of the elongation of the beam of electrons 6. This amplified radiation comes out again through the other window 18. Of course, the windows 16 and 18 are selected so as to be transparent to this radiation (whose frequency is selected from the band of frequencies the laser is able to amplify).

Means (not shown) are naturally provided so as to draw out air from the storage ring 8.

In addition, the laser represented on FIG. 1 includes magnetic means 22 which create a magnetic configuration enabling the beam of electrons 6 to circulate in the storage ring along a closed path. These magnetic means 22 are constituted by suitable windings fed with electric energy by means (not shown). These windings are outside the storage ring 8 and disposed along the latter (except on the elongations 12 and 14).

Thus the magnetic configuration, produced by electric currents external to the storage ring, has a ring shape and comprises two rectilinear sections (corresponding to the two rectilinear sections of the storage shape in the shape of a race course).

Furthermore, so as to be able to confine a beam of electrons whose energy may be several hundreds of keVs and whose intensity may be several hundreds of amperes, a configuration is selected which has not merely an axial component along the path of the beam, but also a poloidal component suitable for keeping in stable equilibrium the current ring constituted by the beam of electrons circulating in the storage ring.

It is also essential that the magnetic configuration is able to lend itself to the placing of the acceleration means 4 (which make it possible to form the beam of relativist electrons and keep the energy of the latter at the value corresponding to the resonance of the laser).

So as to ensure that these conditions are satisfied, the magnetic configuration known under the name of "Stellarator" or a variant of the latter, known under the name of "Torsatron" or "Heliotron" is selected.

Up until now, these magnetic configurations have more particularly been developed for the magnetic containment of hot plasmas in controlled thermonuclear fusion applications.

Detailed information concerning Stellarators are given in the documents (8) and (9) and in the document (10) concerning Torsatrons. The document (11) also contains a synthetic presentation of these configurations.

Figure 2A:
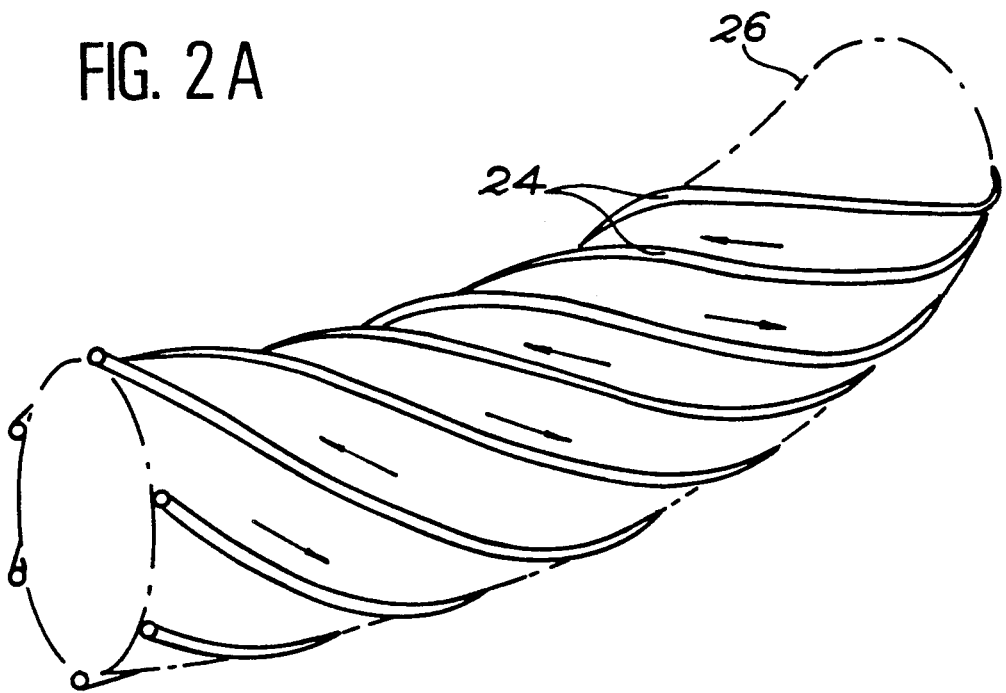

A Stellarator type configuration is obtained by adding to a toric solenoid, creating a guidance toroidal field, helical spires 24 (FIG. 2A) which are wound onto a toric surface 26 which encompasses the sensitive volume of the Stellarator. Starting from a meridian plane, these spires reclose onto one another on returning to this outgoing meridian plane. They are even in number and are traversed by electric currents with alternate directions so that they create a multipolar magnetic field which is annulled on the magnetic axis. This axis is a particular magnetic field line which recloses onto itself after one single revolution (in the storage ring).

Figure 2B:
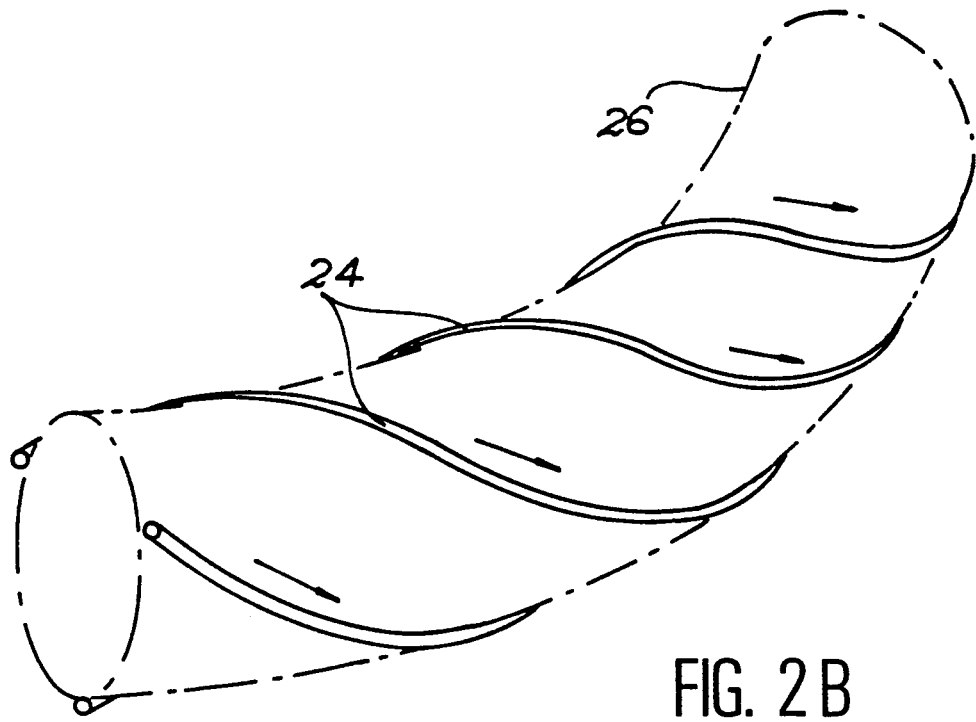

The Torsatron or Heliotron differs from the Stellarator in that the spires 24 enabling this Torsatron type configuration to be obtained are traversed by electric currents of the same direction (FIG. 2B).

Figure 3:
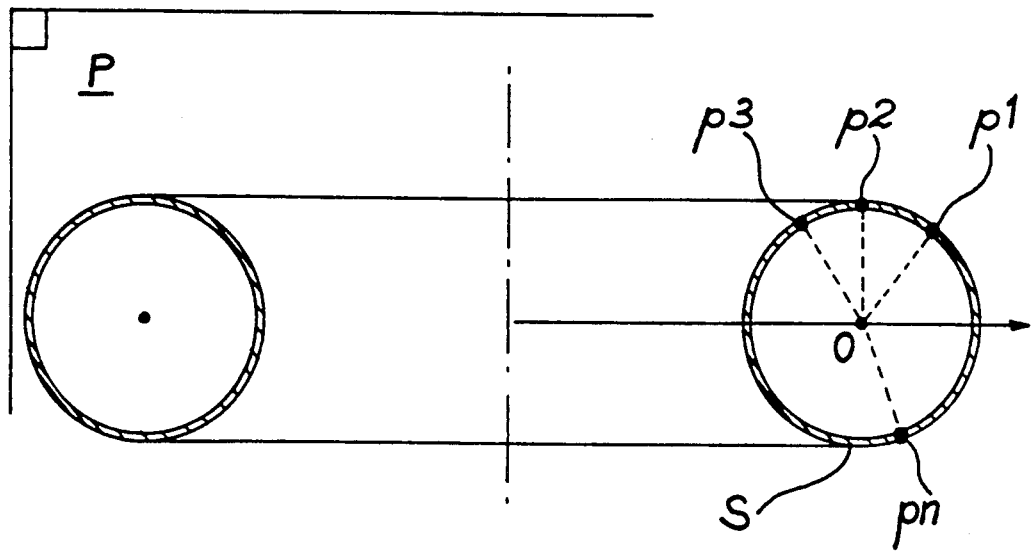

One main characteristic feature of a Torsatron or Stellarator type configuration is the rotational transformation of the magnetic field lines, which may be visualized by considering one section of the configuration by one meridian plane P (plane of FIG. 3), which contains a vertical axis X.

If a magnetic field line is followed starting from one point p1 of the plane P, after one complete revolution around the axis X, the field line recuts the plane P at a point p2; after two revolutions, it cuts the plane P at a point p3 and after n revolutions, it cuts it at a point pn. This field line is wound onto a toric-shaped or roughly toric-shaped magnetic surface S whose circular or approximately circular track can be seen in the plane P.

There is one particular field line (magnetic axis) which recloses onto itself after a single complete revolution and whose track in the plane P is marked by the point 0, the center of the track of the magnetic surface S. In reality, a magnetic surface may be spaced considerably from a torus when it is spaced from the magnetic axis.

A Stellarator or Torsatron type configuration is particularly advantageous for the storing of intense beams of electrons close to the magnetic axis. In fact, the rotational transformation of the magnetic field lines considerably reduces the mean drift of the electrons transversally to the magnetic field. Thus, it is possible to contain the electrons of the beam during a large number of revolutions of the storage ring. In the absence of rotational transformation, the electrons would very quickly be deflected towards the wall of the storage ring.

In the present invention, configurations are thus not used whose magnetic field lines do not have any rotational transformation.

In the invention, Tokamak type configurations are envisaged whose rotational transformation results in the poloidal component due to the beam of electrons itself.

Again as regards the source of electrons 2 and the acceleration means 4, in one particular embodiment (not shown), it is possible to inject from outside the beam of electrons into the magnetic configuration (Stellarator or Torsatron, for example). In order to do this, the beam of electrons is formed and accelerated in an independent device and is injected into a magnetic configuration by means of a device known as a "diverter" by using the "holes" existing in the magnetic configuration close to the singular points of the field lines, points where the magnetic field is annulled.

Figure 4:
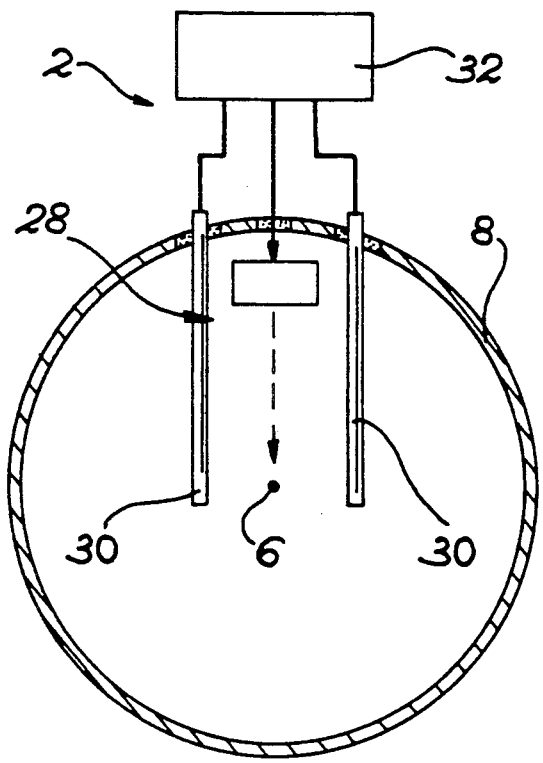

Nevertheless, it is much simpler to form and accelerate the beam of electrons in the storage ring 8. To this effect, conventional electron emitting cathode means 28 (FIG. 4) are used and are placed inside the storage ring 8 sufficiently close to the wall of the latter so as to avoid being on the path of the beam of electrons and which comprise parallel metal plates 30 extending as far as both sides of the beam of electrons 6 and adapted to create between them a pulse electric field making it possible to extract the electrons from the cathode and send them to the magnetic axis of the configuration (axis of the beam of electrons 6) along which they are then accelerated by the acceleration means 4.

The means 28 are controlled by suitable means 32 outside the storage ring and connected to the means 28 through electrically insulating sealed passages.

The means for accelerating the electrons are induction acceleration means adapted to the production of intense beams of electrons in a Stellarator or Torsatron type configuration.

Up until now, such induction acceleration means have been solely used to heat a plasma in controlled thermonuclear fusion applications.

The acceleration of electrons by induction consists of producing an accelerator electric field along the force lines of the magnetic containment field (and thus along the magnetic axis) by means of varying the magnetic flux in the loop formed by the storage ring.

In order to produce this flux variation, it is possible to use an iron core 34 which traverses the "plane" of the storage ring 8 (flat surface delimited by this ring) and which is provided with a primary exciting winding 36, itself provided with suitable electric power supply means 38. In fact, this actually concerns a transformer whose secondary winding is constituted by the beam of electrons 6 with a closed path in the storage ring 8.

This circuit is calculated in the same way as a transformer. For example, so as to obtain an electric field of 300 V/m, the use of a frequency of about kHz (the well-recognised frequency of 500 Hz as regards aeronautical equipment) makes it possible result in a suitable iron mass.

In this respect, this storage ring 8 is made of a non-magnetic material given the fact that the magnetic configuration is generated by the windings outside the storage ring 8. For example, this material may be a ceramic material or quartz or, more simply, a non-magnetic stainless steel.

In this latter case, however, it is advisable to interrupt the electric continuity of the storage ring 8 so as to enable the induced electric field to exist along the magnetic axis. To this effect, one section (made of stainless steel) of the storage ring 8 is replaced by an electrically insulating non-magnetic section 40 (a ceramic material, for example), which is seal-connected to the rest of the storage ring 8 by flanges.

By means of the induction acceleration means, the electrons follow the magnetic field lines by gaining the energy in the electric field produced by induction. It may be regarded that the flux variation producing the electric field is slow with respect to the time the electrons make in carrying out one revolution of the storage ring and thus, as a first approximation, that the electric field is constant during the acceleration process.

The equation of the movement of one electron during the acceleration phase of the latter is thus written:

$$(g^2-1)^{\frac{1}{2}} = |e| \cdot |E| \cdot T \cdot (m_0 \cdot c) - 1 \quad (1)$$

with:
$|e|$: absolute value of the charge of an electron
$|E|$: module of the accelerator electric field
T: acceleration time

22-½ g: $(1-v/c)$
c: speed of the light
v: speed acquired by the electron
$m_0$: mass of electron at rest The equation (1) shows that there is a simple relation between the energy of the electrons, which is defined by g, and the product of the module of the electric field by the acceleration time T. Thus, it is by acting on this product that enables the energy of the electrons to be determined. It shall be observed that the acceleration time T may not assume a value exceeding the lifetime of the electrons in the storage ring.

By way of example, by considering a storage ring whose perimeter is about 4 meters, a magnetic flux variation inducing a potential difference of about 400 V per revolution makes it possible, according to the equation (1), to accelerate the electrons up to g=2 in a time of about $3.10^{-5}$ seconds. It is possible to increase or reduce this time by playing on the intensity of the induced electric field.

In practice, the acceleration time of the electrons is extremely short with respect to the magnetic induction flux variation time. Accordingly, it is possible by acting on the control of the electron emitting cathode to produce a succession of current pulses suitably spaced from each other but accelerated over the same quarter period of the induced electric field produced by the transformer.

Of course, it is also possible to use this transformer to compensate the loss of energy sustained by the electrons by means of synchroton radiation transmission and by electromagnetic radiation transmission in the wiggler 10 by suitably synchronizing the induced electric field with the electrons (so that the latter are re-accelerated with good energy when they repass in the transformer).

Figure 5:
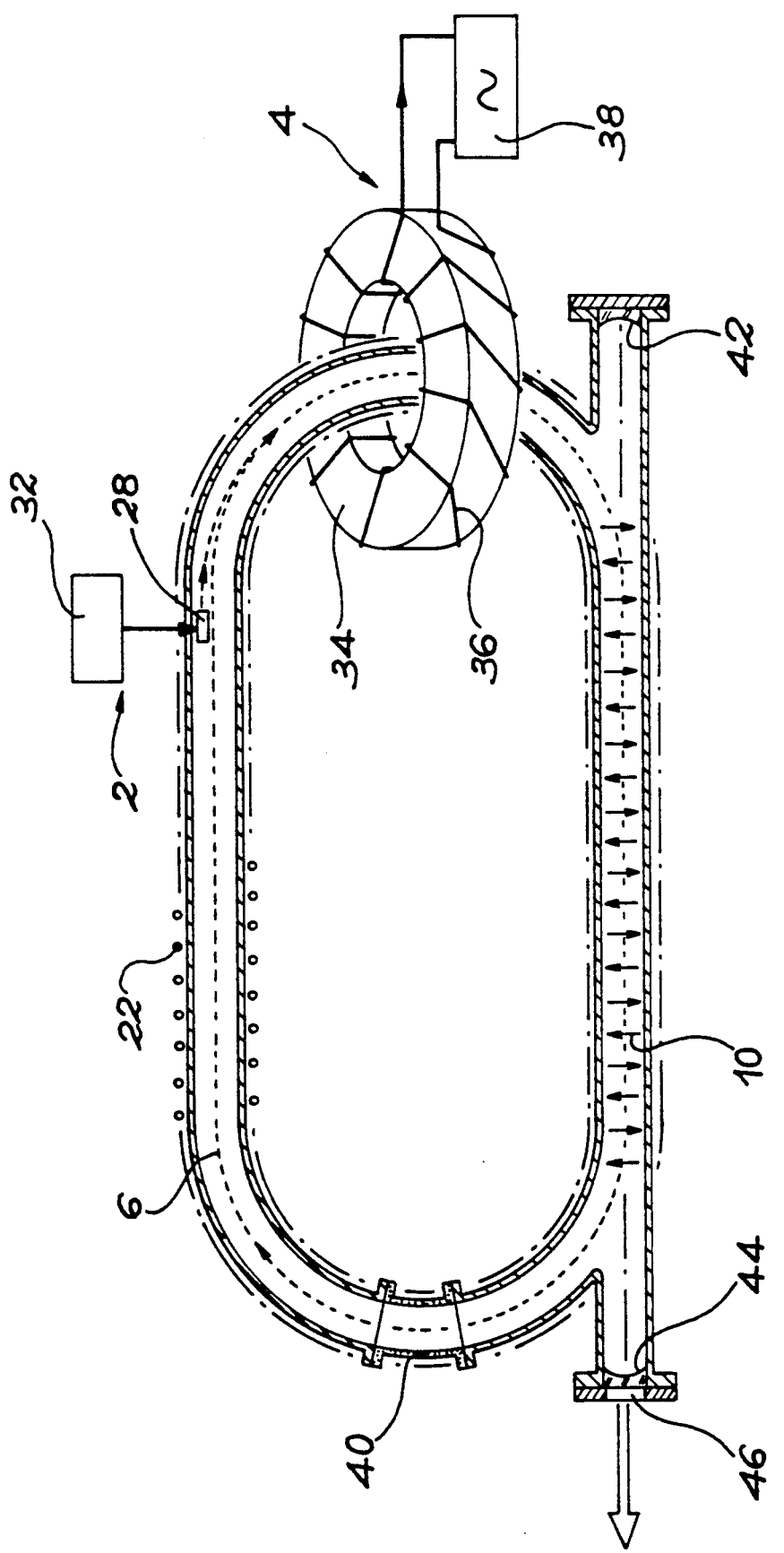
FIG. 5 is a diagrammatic view of another particular embodiment of the laser of the invention and functioning as an oscillator.

FIG. 5 diagrammatically shows another free electron laser conforming to the invention. This other laser is an oscillator and comprises an optical cavity making it possible to trap the electromagnetic radiation transmitted by the beam of relativist electrons when this beam passes into the magnetic wiggler provided for this laser.

The laser represented on FIG. 5 merely differs from the one shown on FIG. 1 by the fact that the windows 16 and 18 are suppressed and respectively replaced by two focussing mirrors 42 and 44 which are mounted on both sides of the magnetic wiggler 10 on the internal faces of the screw caps of the extensions 12 and 14 of the storage ring.

One of the two mirrors, namely the mirror 44 in the example shown, is semi-transparent so as to allow for passage of one part of the electromagnetic radiation generated in the wiggler 10, and the flange, on which this mirror is mounted, is provided with a window 46 transparent to this electromagnetic radiation (the mirror 42 being totally a reflector for this electromagnetic radiation).

In one variant (not shown), the two mirrors 42 and 44 are totally reflective as regards the electromagnetic radiation, and the mirror 44 situated opposite the window 46 is pierced at its center with an opening allowing for the passage of the electromagnetic radiation generated in the wiggler 10.

So as to obtain a radiation with maximum intensity, it is much simpler to adjust the energy of the beam of electrons than providing the mirrors 42 and 44 with adjustable spacing and adjusted so as to obtain this maximum intensity.

In the present invention, instead of using a single "laser section" needing to be rectilinear and provided with a magnetic wiggler, it is possible to use a plurality of rectilinear "laser sections" optically combined by suitably adapted mirrors to reflect the electomagnetic radiation generated in these sections (which are respectively provided to this effect with magnetic wigglers). Of course, the magnetic configuration is then conceived so that in each "laser section" the beam of electrons extends along a straight line so as to interact with the corresponding magnetic wiggler which generates a spatially periodic magnetic field directed transversally to the beam of electrons.

Figure 6:
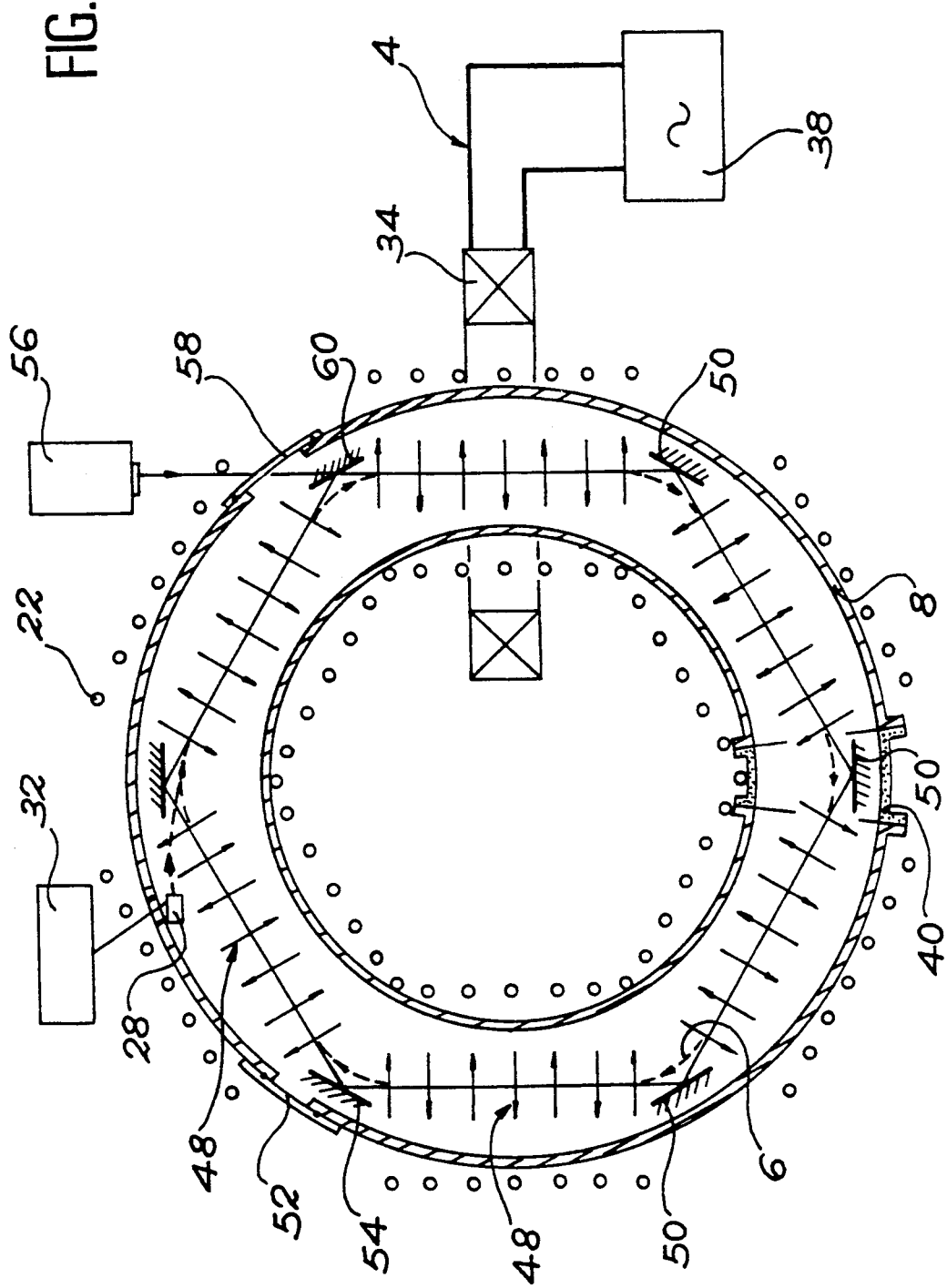
FIG. 6 is a diagrammatic view of another particular embodiment of the laser of the invention in which the path of light produced has the shape of a polygon.

All this is illustrated on FIG. 6 which diagrammatically represents a free electron laser conforming to the invention and functioning as an oscillator whose storage ring 8 is circular and comprises rectilinear "laser sections" 48, each of the latter comprising a wiggler 10.

The "laser sections" thus define a polygon—a hexagon in the example represented on FIG. 6—and at each top of this polygon, mirrors 50 are placed to reflect the electromagnetic radiation derived from each magnetic wiggler towards the next magnetic wiggler.

The path of the beam of electrons is rectilinear in each magnetic wiggler and curves inwards so as to pass into the next magnetic wiggler where it is also rectilinear.

The generated electromagnetic radiation, whose path has the shape of a polygon, is recovered outside the storage ring by means of a window 52 transparent to this radiation and mounted on the circular storage ring opposite one of the mirrors 50 which is semi-transparent with regard to this electromagnetic radiation and which bears the reference 54 on FIG. 6.

FIG. 6 shows the other components of the laser, especially the source of electrons 2, the electron acceleration means 4 and the external windings allowing for extension of the beam of electrons on a straight line in the wigglers 10.

Of course, the laser of FIG. 6 may function as an electromagnetic radiation amplifier by adding to it a source 56 for this radiation placed opposite another window 58 transparent to this radiation, itself placed opposite one of the mirrors 50 differing from the mirror 54 and also semi-transparent with regard to the radiation, this other semi-transparent mirror bearing the reference 60 on FIG. 6.

The free electron laser diagrammatically represented on FIG. 6 readily lends itself to the use of a Stellarator type magnetic configuration and in this respect it is possible to refer to the Stellarator type configuration used at the Max Planck Institut (IPP) Garching and which is known under the name of WENDELSTEIN.

DOCUMENTS CITED (1) H. J. Barkley and col., Feasibility study on a high power (1 MW) millimeter-wave (140 GHz) transmission system for diagnostics of alpha-particles in JET by collective millimeter-wave scattering, JET-R(88), 14 Jan. 1988.

(2) J. Johner, I. Fidone, A conceptual steady state Tokamak reactor with passive current generation, Nuclear Fusion, vol. 29, No 3 (1989)

(3) I. Fidone, G. Granata, J. Johner, Current sustainment by synchrotron radiation in a Tokamak device, Phys. fluids 31, Aug. 1988, p. 2300–2309

(4) W. Henle and col., Study of ECW transmission lines for NET, 28 Feb. 1989, ITER-IL-HD-6-9-E (5) D. W. Ignat and col., The compact ignition Tokamak and electron cyclotron heating, PPPL-2584, January 1989

(6) J. M. Oréga and M. Billardon, Le laser à électrons libres (Free electron lasers), Pour la science, April 1986, p. 91 to 100

(7) F. Hartemann, J. M. Buzzi, High efficiency millimeter wave free electron laser experiments, Proc. 10th Int. Conf. on F.E.L., Jerusalem, Israel, 29 Aug. 1988

(8) L. Spitzer, Le principe du Stellarator (The principle of the Stellarator), p.2170, Int. Conf, Geneva 1958

(9) F. F. Chen and col., Runaway electrons and cooperative phenomena observed in B. I. Stellarator, p.358, Int Conf., Geneva 1958

(10) C. Gourdon and col., The Torsatron without toroidal coils—a solution of the divertor problem, Nuclear fusion, 11 (1971), p.161

(11) La fusion thermonuclear contrôlée par confinement magnétique (Thermonuclear fusion controlled by magnetic containment), Masson Editeur, Paris (1987)

What is claimed is:

1. A free electron laser comprising:
    a source of electrons,
    acceleration means for accelerating the electrons issuing from the source and for supplying a beam of said electrons to a storage ring for storing said beam of electrons, said storage ring comprising at least one rectilinear section,
    magnetic means for generating a closed magnetic configuration having a magnetic axis, said configuration having a first magnetic field component which is mainly directed parallel to the circulating beam of electrons and which enables said beam to circulate within said storage ring, and a second magnetic field component which compensates for a drift of the electrons transversely to the axis of the beam of the electrons, and
    at least one magnetic wiggler which is provided for the storage ring and which is placed on said at least one rectilinear section and which is traversed by the beam of electrons circulating in the ring,
    wherein said electron beam is accelerated and confined within said storage ring.

2. A laser according to claim 1, wherein the said second magnetic field component is a poloidal component providing the magnetic field lines with a rotational transformation which compensates for the said drift.

3. A laser according to claim 2, wherein the magnetic configuration is a Stellarator-type type magnetic configuration.

4. A laser according to claim 2, wherein the magnetic configuration is a Torsatron-type magnetic configuration.

5. A laser according to claim 2, wherein the magnetic configuration is a Tokamak-type magnetic configuration.

6. A laser according to claim 1, wherein the source of electrons is placed inside the storage ring and includes means for emitting electrons and for sending said electrons onto the magnetic axis of the magnetic configuration, said magnetic axis along which they are then accelerated.

7. A laser according to claim 1, wherein the electron acceleration means include means for generating and causing to temporarily vary a magnetic flux in a flat surface delimited by the storage ring, the magnetic flux variation inducing in the storage ring a longitudinal electric field restoring on each revolution a power consumed by the electrons in the laser emission.

8. A laser according to claim 7, wherein the electron acceleration means include a transformer comprising:
    a magnetic circuit traversing the flat surface delimited by the storage ring, and
    a primary circuit controlled in such a way as to obtain said magnetic flux variation, the beam of electrons circulating in the storage ring forming a secondary circuit for said transformer.

9. A laser according to claim 1, wherein the beam of electrons follows a path comprising a plurality of rectilinear sections, wherein the laser includes a plurality of magnetic wigglers respectively placed on the rectilinear sections and successively traversed by the beam of electrons and wherein the laser further includes between each magnetic wiggler and the next magnetic wiggler light reflection means such that the light generated in each wiggler is reflected towards the next wiggler.

10. A laser according to claim 9, wherein the magnetic wigglers are distributed along the storage ring so that the path of the light generated in the laser has the shape of a regular polygon.

* * * * *

UNITED STATES PATENT AND TRADEMARK OFFICE
CERTIFICATE OF CORRECTION

PATENT NO. : 5,060,232
DATED : October 22, 1991
INVENTOR(S) : Claude Etievant

It is certified that error appears in the above-identified patent and that said Letters Patent is hereby corrected as shown below:

Cover page, under "OTHER PUBLICATIONS", last item, "vol," should read --vol.--.

Column 7, line 51, "22- " should be --2  2 - 1/2--;
line 16, "300 V/m" should read --300V/m--.

Column 10, line 36, delete "type" (second occurrence).

Column 12, lines 2-4, the spacing between the text should be single-spaced, and not double-spaced.

Signed and Sealed this

Twenty-third Day of March, 1993

*Attest:*

STEPHEN G. KUNIN

*Attesting Officer*     *Acting Commissioner of Patents and Trademarks*